Patented Dec. 5, 1939

2,182,524

UNITED STATES PATENT OFFICE 2,182,524

ADHESIVE

Robert W. Maxwell, Wilmington, Del., assignor to E. I. du Pont de Nemours & Company, Wilmington, Del., a corporation of Delaware No Drawing. Application October 1, 1937, Serial No. 166,729

2 Claims. (Cl. 134—23.1)

This invention relates to adhesives, particularly those adapted for use in the manufacture of corrugated paper board on high speed boxboard machines, and is more particularly directed to adhesives containing starch and a salt of deacetylated chitin.

Unhydrolyzed starch cannot readily be applied as such to the manufacture of laminated paper board and it has been proposed as in the Bauer Patent 2,051,025 to suspend unhydrolyzed starch with a gelatinous material. Boxboard adhesives thus made up with unhydrolyzed starch have been subject to the disadvantage that adhesive bonds made using them are of low resistance to water.

Radically different from starch is deacetylated chitin by the use of which adhesive bonds of great resistance to water and moisture may be made. As is shown in the Rigby Patent 2,047,226 salts of deacetylated chitin constitute excellent adhesives. These salts of deacetylated chitin set upon standing to a water resistant film, and the degree and rapidity of setting may be increased in many instances by heating the adhesive.

The salts of deacetylated chitin are not entirely satisfactory as adhesives for the manufacture of corrugated paper board. Corrugated paper board is made on high speed machines and an adhesive satisfactory for use on such equipment must be easily applied by rolls and must set quickly so that after only a brief time the board can be cut and handled. Salts of deacetylated chitin make too viscous a solution and do not set with sufficient rapidity for entirely satisfactory operation in this type of use.

I have found that adhesives ideally adapted for the manufacture of corrugated paper board on high speed boxboard machines may be prepared using a combination of unhydrolyzed starch and a salt of deacetylated chitin. The starch causes the adhesive to set rapidly, and the deacetylated chitin suspends the starch and itself hydrolyzes to set permanently. The starch and the salt of deacetylated chitin cooperate to make a water resistant, quick-setting adhesive ideally adapted for boxboard manufacture, each constituent mutually modifying and benefiting the action of the other.

While the cause for the mutually beneficial action of unhydrolzed starch and a salt of deacetylated chitin is not entirely clear, it appears that one effect may arise from a chemical interaction. The salt of deacetylated chitin as it sets may hydrolyze to free an acid. The acid could then effect an incipient surface gelatinization of the starch, lowering the gelation temperature of the starch and speeding hydrolysis. The loose combination of acid with the starch would withdraw acid from the system to an extent sufficient to aid setting of the salt of deacetylated chitin.

The adhesive compositions of my invention are acidic, unlike the compositions of Bauer. The suspended starch adhesives of the Bauer patent which are fast setting enough to be commercially usable on corrugated board machines are alkaline or neutral whereas the compounds of my invention have a pH distinctly below seven. By the use of an acidic rather than a basic adhesive the danger of alkali staining is obviated.

Unlike the compositions of the Bauer patent the adhesives of my invention set to give a water resistant bond. The salts of deacetylated chitin in admixture with unhydrolyzed starch hydrolyze to set permanently and this action is aided by the heating of the assembled boxboard according to the usual practice. As will be shown hereinafter, paper board made using the adhesives of my invention is water and moisture resistant.

The adhesives of my invention using unhydrolyzed starch and a salt of deacetylated chitin are further advantageous in that their viscosity remains relatively constant after the adhesive is prepared. With the alkaline compositions of the Bauer patent adhesives are obtained which lose their viscosity rapidly after they are made up and it is only with difficulty that such compositions can be handled and used.

The salts of deacetylated chitin used with unhydrolyzed starch according to my invention are shown as adhesives in the Rigby Patent 2,047,226. The preparation of the salts of deacetylated chitin is further described in the Rigby Patent 2,040,879. While any salts such as the maleate, tartrate, benzoate, or naphthenate, as described in the Rigby patents, may be used, it is preferred to employ an acetate of deacetylated chitin.

The amount of a salt of deacetylated chitin to use in the adhesives of my invention may be widely varied. In general enough will be used effectively to suspend the starch and to lend a desired degree of waterproofness to the adhesive bond. The minimum amount of a salt of deacetylated chitin will be determined by the behavior of the adhesive mixture, enough being used so that upon setting of the adhesive a bond of satisfactory initial strength is obtained. An excessively large amount of a salt of deacetylated chitin should not be used because of the high cost and because the viscosity of the adhesive would be increased.

The amount of a salt of deacetylated chitin to use will be determined moreover by the character of the deacetylated chitin used. Solutions containing identical amounts of a salt of deacetylated chitin may have different viscosities if the deacetylated chitin used in each instance is different.

A five per cent aqueous acetic acid solution containing five per cent of a typical deacetylated chitin has a viscosity of 880 poises. The acetate of this deacetylated chitin would preferably be used in the adhesive compositions of my invention in an amount equivalent to from about one and one-half to about four per cent of the weight of the total adhesive composition. More specifically I prefer to use about three per cent of the acetate of this deacetylated chitin.

When a different deacetylated chitin is used the salt of deacetylated chitin should be employed in the amount required to lend to an adhesive the same viscosity as the acetate of the typical deacetylated chitin above mentioned. In other words, a salt of a deacetylated chitin should preferably be used in an amount equivalent in its effect on the adhesives' viscosity to from about one and one-half to about four per cent of an acetate of a typical deacetylated chitin, a five per cent aqueous acetic acid solution containing five per cent of which typical deacetylated chitin has a viscosity of 880 poises.

For instance, if instead of the above typical deacetylated chitin there is used one such that a five per cent aqueous acetic acid solution of the deacetylated chitin has a viscosity of 26 poises, the acetate of this deacetylated chitin would be used in an amount equivalent to about three to five per cent of the weight of the total adhesive. Similarly, if a solution as aforesaid has a viscosity of 2145 poises, the acetate of that deacetylated chitin should be used in an amount equivalent to about one to three and one-half per cent of the total adhesive weight.

The ungelatinized starch used according to my invention may be any unhydrolyzed starch material capable of taking up water upon heating as shown in the Bauer patent. The term "starch" is therefore used in its broad sense and is not limited to a refined product known to the trade as starch. Among the readily available materials suitable are cornstarch, tapioca starch, and potato starch. It will be understood that the adhesives of my invention set quickly upon the application of heat by reason of the hydrolysis of starch and it will therefore be understood that the expression "unhydrolyzed starch" includes starch treated or modified in various ways, the essential thing being that it retain the ability to absorb water on heating.

The amount and concentration of starch may of course be widely varied in accordance with the practice of the Bauer patent and in accordance with considerations known to the art. In general the amount of starch must be regulated with reference to the setting time of the adhesive, having consideration in each specific instance for the viscosity of the adhesive and its content of a salt of deacetylated chitin. More specifically, from about fifteen to about thirty per cent of starch, based on the total adhesive composition, should be used. Still more specifically I have found the use of about eighteen to about twenty-two per cent of starch with the previously indicated amounts of a salt of deacetylated chitin ideal for a fast setting adhesive for use on corrugated paper board machines.

A specific typical composition which I have found successful has the following constituents in the indicated parts by weight:

| | |
|---|---|
| Acetate of deacetylated chitin | 3.0 |
| Unhydrolyzed cornstarch | 20.0 |
| Water | 76.8 |

The acetate of deacetylated chitin was prepared with a grade of deacetylated chitin such that a five per cent aqueous acetic acid solution containing five per cent of the deacetylated chitin had a viscosity of 880 poises. A deacetylated chitin having a viscosity as aforesaid of 26 poises could be substituted in the composition of this example using four per cent of the acetate of this deacetylated chitin. Similarly, there may be substituted two and eight-tenths per cent of an acetate of a deacetylated chitin having a viscosity of 2145 poises as aforesaid.

This adhesive was used in the manufacture of double-faced corrugated boxboard on a Langston boxboard machine. The liners were a 9-point kraft paper. Finished board was produced at a rate of two hundred and fifty-five feet per minute. The adhesive set up quickly and was effectively used by the machine. The finished board was of excellent character.

Water resistance tests were made on this finished board by cutting samples three inches wide, supporting the samples on a grill, and attaching a three hundred gram weight in such a manner that the weight tended to pull the liner away from the corrugated medium. This assembly of a supported and weighted sample was immersed in water and after six days of soaking the bond had not broken.

Corrugated board was made on the same machine under the same conditions and using the same materials except that the adhesive was an unhydrolyzed starch suspended in a gelatinized starch medium. Board made with this adhesive was tested in the above described manner and the bonds were found to break within two or three minutes after the sample was submerged in water.

While the adhesive compositions of my invention are particularly suitable for the manufacture of corrugated board, it will be understood that they may also be used in the manufacture of other laminated board such as solid paper board. It will also be understood that my novel adhesive compositions may advantageously be employed in numerous other uses requiring an adhesive which sets quickly upon application of heat.

While I have shown certain illustrative compositions it will be understood that those skilled in the art may prepare numerous adhesives with unhydrolyzed starch and a salt of deacetylated chitin without departing from the spirit of my invention.

I claim:

1. An adhesive composition comprising from about fifteen to thirty per cent of unhydrolyzed starch and a salt of deacetylated chitin in an amount equivalent in its effect on the adhesives' viscosity to from about one and one-half to about four per cent of an acetate of a typical deacetylated chitin a five per cent aqueous acetic acid solution containing five per cent of which typical detacetylated chitin has a viscosity of 880 poises.

2. An adhesive composition comprising from about eighteen to twenty-two per cent of unhydolyzed starch and an acetate of deacetylated chitin in an amount equivalent in its effect on the adhesives' viscosity to about three per cent of an acetate of a typical deacetylated chitin a five per cent aqueous acetic acid solution containing five per cent of which typical deacetylated chitin has a viscosity of 880 poises.

ROBERT W. MAXWELL.